United States Patent [19]

Wengrovius et al.

[11] Patent Number: 5,319,040
[45] Date of Patent: Jun. 7, 1994

[54] METHOD FOR MAKING SUBSTANTIALLY SILANOL-FREE SILICONE RESIN POWDER, PRODUCT AND USE

[75] Inventors: Jeffrey H. Wengrovius, Scotia; Timothy B. Burnell, Schenectady; Michael A. Zumbrum, Clifton Park, all of N.Y.

[73] Assignee: General Electric Company, Schenectady, N.Y.

[21] Appl. No.: 30,740

[22] Filed: Mar. 12, 1993

[51] Int. Cl.$^5$ ............................................. C08G 77/38
[52] U.S. Cl. ..................................... 525/478; 528/10; 528/12; 528/15; 528/39; 528/502; 525/474
[58] Field of Search ................... 528/10, 39, 12, 15, 528/502; 525/478, 474

[56] References Cited

U.S. PATENT DOCUMENTS 2,676,182 4/1954 Daudt et al. .
4,584,355 4/1986 Blizzard et al. .
4,585,836 4/1986 Homan et al. .
4,591,622 5/1986 Blizzard et al. .
4,655,767 4/1987 Woodard et al. .
4,774,297 9/1988 Murakami et al. .
4,935,484 6/1990 Wolfgruber et al. .

*Primary Examiner*—Melvyn I. Marquis
*Attorney, Agent, or Firm*—William A. Teoli; William H. Pittman

[57] ABSTRACT

A method for making a substantially silanol-free silicone resin powder having a primary particle size in the range of about 0.1–200 nm and an aggregate particle size of 10 nm to 200 microns is provided. An organic solvent dispersion of an organosiloxane hydrolyzate having triorganosiloxy units and tetrasiloxy units is treated with an organo nitrogen compound, such as a silazane and thereafter spray dried. The substantially silanol-free organosilicon powder has been found useful in making heat curable organopolysiloxane compositions, such as pressure sensitive adhesives.

10 Claims, No Drawings

METHOD FOR MAKING SUBSTANTIALLY SILANOL-FREE SILICONE RESIN POWDER, PRODUCT AND USE

Cross Reference to Related Application

Reference is made to copending applications Ser. No. 08/030,739 filed Mar. 12, 1992, and Ser. No. 08/030,737, filed Mar. 12, 1993 filed concurrently herewith.

BACKGROUND OF THE INVENTION

The present invention relates to substantially silanol-free silicone resin powder having a primary particle size in the range of 0.1–200 nm and an aggregate particle size of 10 nm to 200 microns. More particularly, the present invention relates to a method involving the pretreatment of an organic solvent dispersion of an organosiloxane hydrolyzate with an organosilicon nitrogen material, such as an organosilylamine, or organosilazane, and the spray drying of the resulting mixture to form a substantially silanol-free silicone resin powder useful for making heat curable organopolysiloxane compositions having improved processing characteristics.

A method for making silicone resin powder is shown by Wolfgruber et al, U.S. Pat. No. 4,935,484. An aqueous colloidal suspension of an organo siloxane copolymer is spray dried to produce a silicone resin powder having an average particle diameter of 10 to 150 nm. Although spray dried powders made by Wolfgruber et al can be utilized in a variety of applications as fillers, the powders are contaminated with the emulsifying agent which was was used in the preparation of the organosiloxane copolymer. As taught by Wolfgruber et al, silicone resin powder made by spray drying an aqueous silicone mixture can be used as a substitute for finely divided silica in plastics. However, it has been found that aqueous spray dried powder made in accordance with the method of Wolfgruber et al having triorganosiloxy units, chemically combined with tetrasiloxy units is incompatible with silicone fluids. Attempts therefore to utilize such silicone resin powder to produce heat curable silicone compositions, such as pressure sensitive adhesive (PSA) shown by Murakami et al, U.S. Pat. No. 4,774,297 have been unsuccessful.

In copending application Ser. No. 08/030,737, filed Mar. 12, 1993 is shown a procedure for making a silicone resin powder by spray drying an organic solvent dispersion of an organosiloxane hydrolyzate. The silicone resin powder is dispersible into silicone fluid and useful for making heat curable silicone compositions, such as PSAs. An organic solvent dispersion of an organosiloxane hydrolyzate, comprising triorganosiloxy units, or "M" units of the formula,

  (1)

chemically combined with tetrasiloxy units, or "Q" units of the formula,

  (2)

is spray dried to form a free flowing organosilicon resin powder having a primary particle size of 0.1–200 nm and an aggregate particle size of 10 nm to 200 microns. Although useful heat curable silicone compositions, such as PSAs can be formulated by spray drying the organic solvent dispersions of the organosiloxane hydrolyzates, the viscosites of the resulting PSAs, or component mixtures used in making the heat curable mixture sometimes exceed optimum processing requirements.

It would be desirable therefore to be able to make free-flowing organosilicon resin powder having a primary particle size in the range of 0.1–200 nm, and an aggregate particle size of 10 nm to 200 microns which would be useful in combining with silicone network ingredients, such as a vinyl substituted organopolysiloxane fluid, a silicon hydride siloxane fluid and platinum catalyst to form a PSA having improved processing characteristics.

SUMMARY OF THE INVENTION

The present invention is based on the discovery that free flowing substantially silanol-free organosilicon resin powder can be made which is compatible with silicone fluids and useful for making heat curable silicone compositions, such as PSAs. A principal feature of the invention is the treatment of an organic solvent dispersion of an organosiloxane hydrolyzate, with sufficient organosilicon nitrogen material, such as an organosilylamine or organosilazane, to render the resulting treated organosiloxane hydrolyzate substantially silanol free, or less than 0.2% by weight of residual hydroxy radicals based on the weight of the organosiloxane hydrolyzate, followed by the spray drying of the resulting organic solvent dispersion. Advantageously, the spray dried MQ resin powder which has been treated with the organosilicon nitrogen material can be used directly in combination with silicone network ingredients for making a heat curable silicone composition such as a PSA, as taught by Murakami et al cited above. The viscosities of the resulting mixtures have been found to be substantially less as compared to network component mixtures containing untreated spray dried organosiloxane hydrolyzate.

STATEMENT OF THE INVENTION

There is provided by the present invention, a method for making free flowing substantially silanol-free silicone resin powder having a primary particle size in the range of 0.1–200 nm and an aggregate particle size of 10 nm to 200 microns which process comprises, (1) forming an organosiloxane hydrolyzate under interfacial reaction conditions having an organo to Si ratio of about 0.5 to about 1.5, (2) separating the organosiloxane hydrolyzate from the mixture of (1) in the form of an organic solvent dispersion, (3) treating the organic solvent dispersion with sufficient organosilicon nitrogen material to effect the substantial removal of silanol groups from the organosiloxane hydrolyzate, and (4) spray drying the resulting organic solvent dispersion of (3).

Radicals included by R in formula (1) are for example $C_{(1-6)}$ monovalent hydrocarbon radicals and $C_{(1-6)}$ monovalent hydrocarbon radicals substituted with monovalent radicals inert during condensation or addition reactions. There are included within R, monovalent organic radicals such as, $C_{(1-6)}$ alkyl radicals, for example, methyl, ethyl, propyl, butyl; aryl radicals, such as, phenyl, and halogenated phenyl, for example chlorophenyl.

In addition to MQ resin as defined above, having chemically combined formula (1) and formula (2) units, the organosiloxane hydrolyzate also can includes M'Q resin comprising benzene soluble organosiloxane comprising Q units as defined in formula (2) chemically combined with M' units selected from a mixture of M units of formula (1) and units selected from the group of, $$(R)_2 R^1 SiO_{0.5}, \text{ and} \qquad (3)$$

$$(R)_2 H SiO_{0.5}, \qquad (4)$$

where R is as previously defined, and $R^1$ is a $C_{(2-4)}$ alkenyl radical, and preferably vinyl. M' units also can include an average of up to 0 to 25 mole % of diorganodisiloxy units of the formula, $$R^2RSiO, \qquad (5)$$

and 0 to 25 mole % of monoorganotrisiloxy units of the formula, $$R SiO_{1.5}, \qquad (6)$$

based on the total moles of siloxy units where $R^2$ is a member selected from the group consisting of R, $R^1$ and H.

The organosiloxane hydrolyzate which can be treated with the organosilicon nitrogen material in accordance with the present invention, is a toluene dispersible, resinous organosiloxane. The organosiloxane can contain from about 0.2% to about 5%, and preferably from about 1% to about 3% by weight of hydroxy radicals based on the total weight of organosiloxane resin. A method for making spray dryable organosiloxane hydrolyzate useful in the practice of the invention is by reacting a silica hydrosol, such as a sodium silicate, under acidic conditions with a source of triorganosiloxy units such as shown by formula (1) for example a hexaorganodisiloxane, preferably, hexamethyldisiloxane, or a hydrolyzable triorganosilane, for example, trimethylchlorosilane, or mixtures thereof, followed by recovering a benzene dispersible organosiloxane hydrolyzate.

The organosiloxane hydrolyzate can be used as an organic solvent dispersion having 40 to 60% by weight of solids. Suitable organic solvents are solvents with boiling points below approximately 250° C. which include suitable aromatic hydrocarbons as well as aliphatic hydrocarbons, such as mineral spirits, hexane, heptane and cyclohexane. Spray drying of the organic solvent dispersion of the organosiloxane hydrolyzate can be accomplished in accordance with conventional procedures. A spray dryer can be used, for example, having at least one vortex atomizer nozzle with a rotating atomizer in a dry-gas stream or with a two-fluid nozzle. Unlike the aforedescribed Wolfgruber et al method, however, the organosiloxane hydrolyzate of the present invention is spray dried from an organic solvent rather than an aqueous colloidal suspension. Temperatures which can be employed in the dry-gas stream, such as nitrogen, can be from 90° C. to 300° C. and preferably from 100° C. to 250° C. The output temperature of the gas stream formed on drying can be from 50° C. to 200° C.

In addition to being utilized in making heat curable organopolysiloxane compositions, such as a PSA, the substantially silanol-free organosilicon resin powder of the present invention also can be employed to make damping compositions and potting compositions.

Some of the organosilicon nitrogen materials which can be used in the practice of the invention are organosilylamines or organosilazanes shown by Martellock, U.S. Pat. No. 3,243,404, which is incorporated herein by reference. In addition, silazanes, such as shown in Table 10, p. 186 of An Introduction to the Chemistry of Silicones, by Rochow, 2nd Edition, John Wiley & Sons (1951) also can be used and is incorporated herein by reference. Preferably, hexamethyldisilazane is employed.

In order that those skilled in the art will be better able to practice the present invention, the following examples are given by way of illustration and not by way of limitation. All parts are by weight.

EXAMPLE 1

91 parts of a sodium silicate solution was thoroughly mixed with 130 parts of water. This mixture was added to 81 parts of a cooled 16.5% aqueous HCl solution and the mixture was vigorously stirred over a period of 7 minutes. Shortly thereafter, there was then added 87 parts of isopropanol over a period of 5 minutes. After the isopropanol addition, there was added 31.0 parts of trimethylchlorosilane and 3.4 parts of toluene for a 20 minute period. The reaction mixture was allowed to warm to room temperature and was then reheated to reflux for 1.5 hours. There was then added 40.5 parts of toluene with stirring. The organic layer was then separated and washed with 120 parts of water. A water/isopropanol/toluene azeotrope was distilled from the solution to provide a 60% by weight of a methylsiloxane hydrolyzate in toluene having a ratio of about 0.65 of trimethylsiloxy units per tetrasiloxy units. It was heated to reflux under nitrogen, and additional water and isopropanol were removed from the toluene dispersion. There was then added 50 parts of hexamethyldisilazane and the reaction mixture was refluxed until IR analysis indicated that the SiOH groups on the methylpolysiloxane resin had been silylated.

The dispersion of the methylsiloxane hydrolyzate in toluene which had been treated with hexamethyldisilazane was spray dried using a Niro Atomizer portable spray drier type HT equipped with a 2-fluid nozzle with a chamber diameter of 31 inches, a cylindrical height of 2 feet, and a 60 degree conical bottom. The inlet/outlet temperatures were 250°/142° C., and the rate was 63 kg/h. There was obtained a white spray dried resin powder having 1.2% residual volatiles and an average particle size of 18 microns. The product was characterized by FTIR and 29Si NMR which indicated that the silicone resin powder was substantially free of silanol and had a trimethylsiloxy to tetrasiloxy ratio of 0.79.

There was prepared a mixture of 15 parts of a polydimethylsiloxane having terminal dimethylvinylsiloxy groups and an average of about 20 dimethylsiloxy units, 22.5 parts of the above spray dried methylpolysiloxane resin, 25 ppm of a platinum catalyst as shown by Karstedt, U.S. Pat. No. 3,775,452 and 0.05% based on the weight of mixture of dimethylmaleate as an inhibitor. (Part A)

There was blended together, 11.14 parts of a polydimethylsiloxane having terminal dimethylhydrogensiloxy groups and an average of 20.5 dimethylsiloxy units, 0.37 parts of a tetradimethylhydrogensiloxy silicate (a silicon hydride cross-linker) and 17.27 parts of the above spray dried silicone resin powder. (Part B)

The above procedure was repeated except that in preparing the Part A and Part B mixtures, spray dried silicone resin powder was used which had not been treated with hexamethyldisilazane prior to spray drying.

The viscosities of the various mixtures containing hexamethyldisilazane treated methylpolysiloxane powder and untreated methylpolysiloxane powder were then compared as shown by the following:

| VISCOSITY OF MIXTURES (CENTIPOISE AT 25° C.) | | |
|---|---|---|
| Silazane Treated | Part A | Part B |
| Yes | 16,500 | 42,000 |
| No | 102,000 | 550,000 |

A pressure sensitive adhesive was prepared by mixing equal molar quantities of the silazane treated Part A and Part B mixtures. The silazane treated PSA was applied onto a 1 mil Mylar polyester film at a thickness of about 1.5 mil and cured at 120° C. for 10 minutes. The same procedure was followed for preparaing a PSA with the spray dried powder free of silazane. The tack and peel adhesion for both PSAs were found to be substantially equivalent. The tacks were about 1,000 g/cm$^2$ and the peel adhesions were about 30 oz/in.

Although the above example is directed to only a few of the very many variables which can be employed in the practice of the present invention, it should be understood that the present invention is directed to a much broader variety of silanol free spray dried organosiloxane hydrolyzate and the use of other organosilicon nitrogen materials and network ingredients as shown in the description preceding this example.

What is claimed is:

1. A method for making substantially silanol-free organosilicon resin powder having a particle size in the range of 0.1–200 nm and an aggregate particle size of 10 nm to 200 microns which process comprises,
   (1) forming an organosiloxane hydrolyzate comprising triorganosiloxy units chemically combined with SiO$_2$ units under interfacial reaction conditions having an organo to Si ratio of about 0.5 to about 1.5,
   (2) separating the organosiloxane hydrolyzate from the mixture of (1) in the form of an organic solvent dispersion,
   (3) contacting the organic solvent dispersion with sufficient organosilicon nitrogen material selected from the class consisting of organosilyl amines and organosilazanes to effect the substantial removal of silanol groups from the organosiloxane hydrolyzate, and
   (4) spray drying the resulting organic solvent dispersion of (3).

2. A substantially silanol-free organosilicon resin powder made in accordance with claim 1.

3. A method in accordance with claim 1, where the organosiloxane hydrolyzate comprises trimethylsiloxy units chemically combined with SiO$_2$ units.

4. A method in accordance with claim 1, where the organosilicon nitrogen material is hexamethyldisilazane.

5. A heat curable composition comprising a silanol-free organosilicon resin powder made in accordance with claim 1, a vinyl substituted methylpolysiloxane fluid, a silicon hydride siloxane fluid, an inhibitor and an effective amount of a platinum catalyst.

6. A pressure sensitive adhesive composition comprising a silanol-free organosilicon resin powder made in accordance with claim 1, a vinyl substituted methylpolysiloxane fluid, a silicon hydride siloxane fluid, an inhibitor and an effective amount of a platinum catalyst.

7. A potting composition comprising a silanol-free organosilicon resin powder made in accordance with claim 1, a vinyl substituted methylpolysiloxane fluid, a silicon hydride siloxane fluid, an inhibitor and an effective amount of a platinum catalyst.

8. A liquid injection molding composition comprising a silanol-free organosilicon resin powder made in accordance with claim 1, vinyl substituted methylpolysiloxane fluid, a silicon hydride siloxane fluid, an inhibitor and an effective amount of a platinum catalyst.

9. A heat curable composition in accordance with claim 5, having a silicone hydride crosslinker.

10. A heat curable composition in accordance with claim 5, having a silicone vinyl crosslinker.

* * * * *